(12) United States Patent
Kim et al.

(10) Patent No.: US 9,888,124 B2
(45) Date of Patent: Feb. 6, 2018

(54) ELECTRONIC DEVICE AND BIDIRECTIONAL COMMUNICATION CONTROL METHOD THEREOF

(71) Applicant: Samsung Electronics Co., Ltd, Gyeonggi-do (KR)

(72) Inventors: Jinyup Kim, Gyeonggi-do (KR); Geonsoo Kim, Gyeonggi-do (KR)

(73) Assignee: SAMSUNG ELECTRONICS CO., LTD., Suwon-si, Gyeonggi-Do (KR)

(*) Notice: Subject to any disclaimer, the term of this patent is extended or adjusted under 35 U.S.C. 154(b) by 0 days.

(21) Appl. No.: 15/156,202

(22) Filed: May 16, 2016

(65) Prior Publication Data

US 2016/0337521 A1    Nov. 17, 2016

(30) Foreign Application Priority Data

May 15, 2015   (KR) ......................... 10-2015-0068013

(51) Int. Cl.

| | |
|---|---|
| *H04M 3/42* | (2006.01) |
| *H04M 3/54* | (2006.01) |
| *H04W 4/00* | (2009.01) |
| *H04W 4/02* | (2009.01) |
| *H04B 1/3827* | (2015.01) |
| *H04W 52/02* | (2009.01) |

(52) U.S. Cl.
CPC ............ *H04M 3/548* (2013.01); *H04B 1/385* (2013.01); *H04M 3/42153* (2013.01); *H04W 4/008* (2013.01); *H04W 4/023* (2013.01); *H04W 52/0209* (2013.01); *Y02B 60/50* (2013.01)

(58) Field of Classification Search
CPC . H04M 3/548; H04M 3/42153; H04W 4/008; H04W 52/0209; H04W 4/023; Y02B 60/50; H04B 1/385
USPC ........................................................ 455/417
See application file for complete search history.

(56) References Cited

U.S. PATENT DOCUMENTS

| | | | | |
|---|---|---|---|---|
| 6,134,433 A | * | 10/2000 | Joong ..................... | H04M 3/54 379/211.02 |
| 6,760,601 B1 | * | 7/2004 | Suoknuuti ............... | H04L 29/06 379/90.01 |
| 7,116,975 B1 | * | 10/2006 | Link, II .................. | H04M 3/54 379/211.01 |
| 7,215,754 B1 | * | 5/2007 | Woodson .......... | H04M 3/42068 379/221.09 |

(Continued)

OTHER PUBLICATIONS

"Number, dual number, two number", https://play.google.com/store/apps/details?id=com.aicrm.phonebookplus, Mar. 25, 2014, 10 pages.

*Primary Examiner* — Charles Shedrick

(57) ABSTRACT

An electronic device and bidirectional communication control method thereof for supporting communication between electronic devices. The electronic device of the present disclosure includes a communication unit configured to communicate with other electronic devices; a storage unit configured to store service type and operation mode information per communication service; and a control unit configured to check information on the communication service, determine a service type corresponding to the communication service information, and control a call forwarding function to enable/disable call forwarding to a companion electronic device in an operation mode corresponding to the determined service type.

18 Claims, 10 Drawing Sheets

(56) References Cited

U.S. PATENT DOCUMENTS

| | | | | |
|---|---|---|---|---|
| 7,218,952 B1* | 5/2007 | Alperovich | H04M 3/42153 | 370/329 |
| 7,376,112 B2* | 5/2008 | Liu | H04M 3/42246 | 370/338 |
| 7,996,042 B2* | 8/2011 | Noh | H04M 1/006 | 455/417 |
| 8,655,333 B2* | 2/2014 | Newton | H04M 1/006 | 455/414.1 |
| 2002/0019227 A1* | 2/2002 | Hurme | H04W 8/18 | 455/433 |
| 2002/0164979 A1* | 11/2002 | Mooney | H04M 1/006 | 455/417 |
| 2004/0072558 A1* | 4/2004 | Van Bosch | H04M 1/006 | 455/417 |
| 2005/0215243 A1* | 9/2005 | Black | H04M 1/006 | 455/417 |
| 2005/0272408 A1* | 12/2005 | Wilkes-Gibbs | H04M 19/04 | 455/412.2 |
| 2008/0200192 A1* | 8/2008 | Harris | H04L 12/66 | 455/466 |
| 2008/0207184 A1* | 8/2008 | Wassingbo | H04M 1/7253 | 455/417 |
| 2011/0059732 A1* | 3/2011 | Cai | H04M 3/54 | 455/417 |
| 2014/0047539 A1 | 2/2014 | Holloway et al. | | |
| 2016/0014276 A1* | 1/2016 | Kotreka | H04M 3/543 | 455/417 |
| 2016/0044178 A1* | 2/2016 | Narayanaswamy | H04M 3/54 | 455/558 |
| 2016/0057285 A1* | 2/2016 | Lee | H04M 3/42153 | 455/417 |
| 2016/0057593 A1* | 2/2016 | Shin | H04M 1/56 | 455/417 |
| 2016/0127559 A1* | 5/2016 | Baek | G06F 21/35 | 455/417 |

* cited by examiner

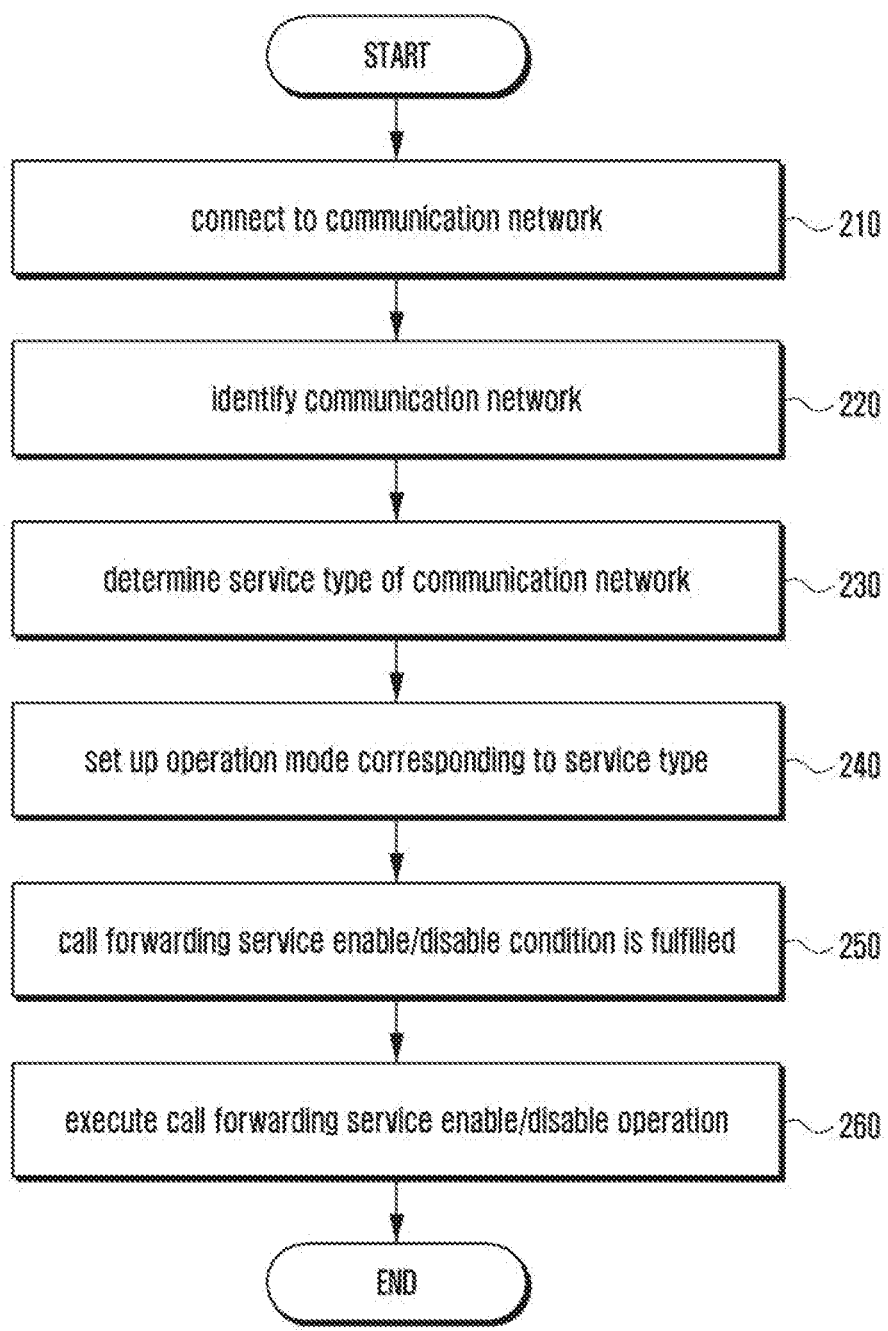

FIG. 4

| CF Type | Country | Operator | MCC/MNC | Multi-SIM | Remark |
|---|---|---|---|---|---|
| first type | Korea | SKT | 45005 | No | SS scheme |
| second type | Singapore | SingTel | 525001<br>525002<br>525007 | YES | ring for primary SIM and, if not received, forward for secondary SIM |
| | | StarHub | 525005 | YES | |
| | | M1 | 525003 | YES | |
| | Malaysia | Maxis | 50212 | YES | ring for primary SIM and, if not received, forward for secondary SIM |
| | Thailand | AIS | 520001<br>525083 | YES | ring for primary SIM and, if not received, forward for secondary SIM |
| | | DTAC | 520005<br>520018 | YES | |
| third type | Italy | Vodafone | 22210 | YES | ring for primary SIM and, if not received, forward for secondary SIM |
| | Spain | Telefonica | 21407 | YES | receive call simultaneously |
| | | Vodafone | 21401 | YES | |
| | | Orange | 21403 | YES | |
| | Germany | Vodafone | 26202 | YES | receive call simultaneously |
| | | DT | 26201 | YES | |
| | | O2 | 26207 | YES | ring for primary SIM and, if not received, forward for secondary SIM |
| fourth type | SS scheme | KT | 45008 | No | select SS scheme of T-Share scheme |

ELECTRONIC DEVICE AND BIDIRECTIONAL COMMUNICATION CONTROL METHOD THEREOF

CROSS-REFERENCE TO RELATED APPLICATION(S) AND CLAIM OF PRIORITY

The present application is related to and claims benefit under 35 U.S.C. §119(a) of Korean Patent Application No. 10-2015-0068013, filed on May 15, 2015, which is hereby incorporated by reference for all purposes as if fully set forth herein.

TECHNICAL FIELD

The present disclosure relates to an electronic device and bidirectional communication control method thereof and, in particular, to an electronic device and bidirectional communication control method thereof for supporting communication between electronic devices.

BACKGROUND

With the advance of hardware and communication technologies, electronic devices support various functions. These days, individuals carry around various electronic devices. In order to configure an electronic device with a communication forwarding function to perform forwarding to another electronic device, the user may have to configure the incoming call forwarding option in the corresponding device or request to a communication service provider for the incoming call forwarding service. In this case, the user may experience some inconvenience because the incoming call forwarding function configuration/registration is established or released manually.

SUMMARY

To address the above-discussed deficiencies, it is a primary object to provide an electronic device and bidirectional call forwarding control method thereof that is capable of facilitating communication service function control efficiently.

In accordance with an aspect of the present disclosure, an electronic device is provided. The electronic device includes a communication unit configured to communicate with other electronic devices; a storage unit configured to store service type and operation mode information per communication service; and a control unit configured to check information on the communication service, determine a service type corresponding to the communication service information, and controls a call forwarding function to enable/disable call forwarding to a companion electronic device in an operation mode corresponding to the determined service type.

In accordance with another aspect of the present disclosure, a bidirectional communication control method of an electronic device is provided. The bidirectional communication control method includes checking information on the communication service, determining a service type corresponding to the communication service information, preparing a call forwarding operation mode corresponding to the determined service type, and controlling, when a call forwarding enable/disable condition is fulfilled, a call forwarding function to enable/disable the call forwarding to a companion electronic device.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 3 is a flowchart illustrating a call forwarding method of an electronic device according to various embodiments of the present disclosure;

FIG. 4 is a diagram exemplifying a table mapping operator identity codes and service types according to various embodiments of the present disclosure;

DETAILED DESCRIPTION

Figure 1:
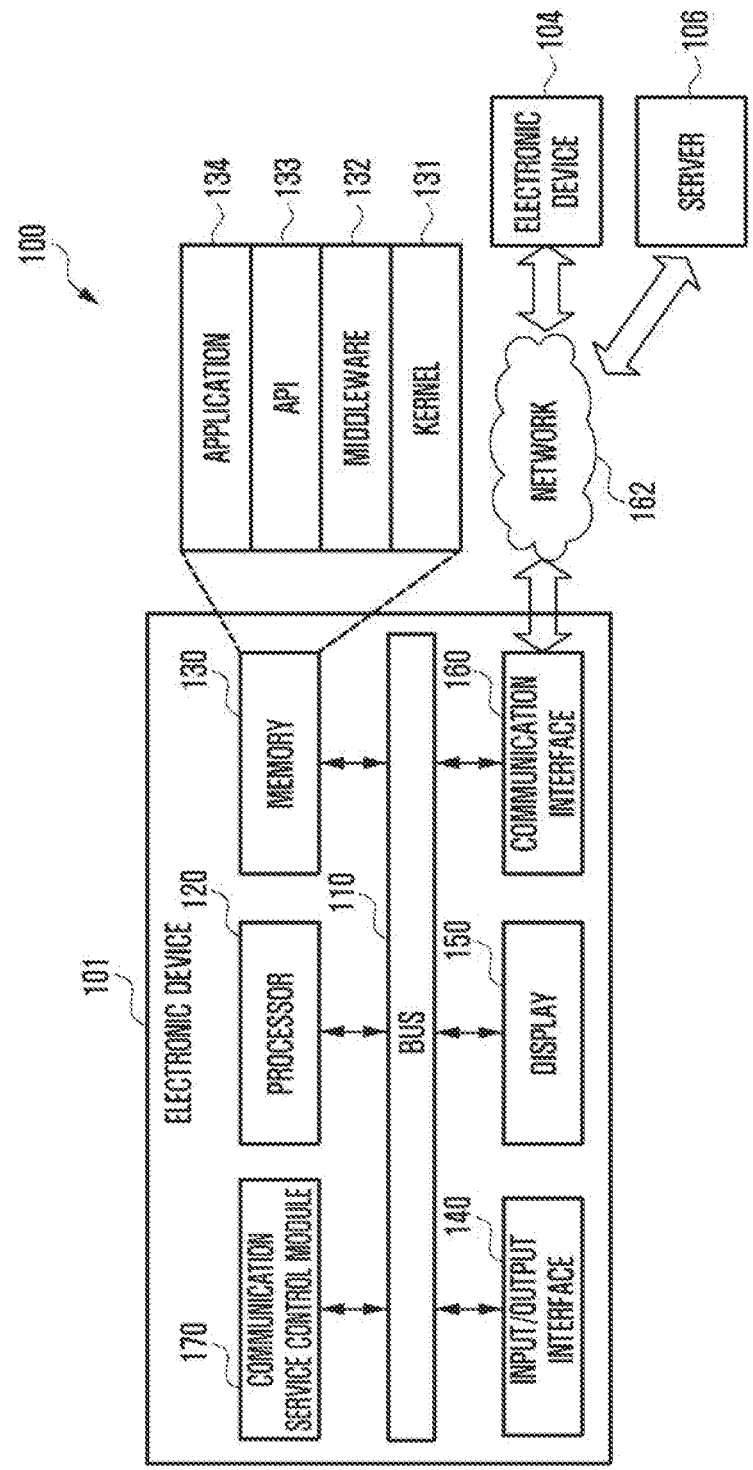
FIG. 1 is a diagram illustrating a network environment including an electronic device according to various embodiments of the present disclosure.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device or system. Exemplary embodiments of the present disclosure are described with reference to the accompanying drawings in detail. Various changes may be made to the disclosure, and the disclosure may have various forms, such that exemplary embodiments will be illustrated in the drawings and described in detail. However, such an embodiment is not intended to limit the disclosure to the disclosed exemplary embodiment and it should be understood that the embodiment include all changes, equivalents, and substitutes within the spirit and scope of the disclosure. Throughout the drawings, like reference numerals refer to like components.

It will be understood that the expressions "comprises" and "may comprise" is used to specify presence of disclosed function, operation, component, etc. but do not preclude the presence of one or more functions, operations, components, etc. It will be further understood that the terms "comprises" and/or "has" when used in this specification, specify the presence of stated feature, number, step, operation, component, element, or a combination thereof but do not preclude the presence or addition of one or more other features, numbers, steps, operations, components, elements, or combinations thereof. In the present disclosure, the expression "and/or" is taken as specific disclosure of each and any combination of enumerated things. For example, A and/or B is to be taken as specific disclosure of each of A, B, and A and B.

As used herein, terms such as "first," "second," etc. are used to describe various components, however, it is obvious that the components should not be defined by these terms. For example, the terms do not restrict the order and/or importance of the corresponding components. The terms are used only for distinguishing one component from another component. For example, a first component may be referred to as a second component and likewise, a second component may also be referred to as a first component, without departing from the teaching of the inventive concept.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present.

The terminology used herein is for the purpose of describing particular embodiments only and is not intended to be limiting of the disclosure. As used herein, the singular forms "a", "an" and "the" are intended to include the plural forms as well, unless the context clearly indicates otherwise.

Unless otherwise defined herein, all terms including technical or scientific terms used herein have the same meanings as commonly understood by those skilled in the art to which the present disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

Examples of an electronic device may include smartphone, table Personal Computer (PC), mobile phone, video phone, electronic book (e-book) reader, desktop PC, laptop PC, netbook computer, Personal Digital Assistant (PDA), Portable Multimedia Player (PMP), MP3 player, mobile medical appliance, camera, wearable device (e.g., head-mounted device (HMD) such as electronic glasses, electronic clothing, electronic bracelet, electronic necklace, electronic appcessory, electronic tattoo, smartwatch, etc.

According to an embodiment, the electronic device may be one of smart home appliances having one or more operation support functions. Examples of the smart electronic appliance as an electronic device may include television, Digital Video Disk (DVD) player, audio player, refrigerator, air-conditioner, vacuum cleaner, electronic oven, microwave oven, laundry machine, air cleaner, set-to box, TV box (e.g., Samsung HomeSync™, Apple TV™, and Google TV™), game console, electronic dictionary, electronic key, camcorder, and electronic frame, etc.

According to an embodiment, examples of the electronic device may include medical device (e.g., Magnetic Resonance Angiography (MRA), Magnetic Resonance Imaging (MRI), Computed Tomography (CT)), Navigation device, Global Positioning System (GPS) receiver, Event Data Recorder (EDR), Flight Data Recorder (FDR), car infotainment device, maritime electronic device (e.g., maritime navigation device and gyro compass), aviation electronic device (avionics), security device, vehicle head unit, industrial or home robot, Automatic Teller's Machine (ATM) of financial institution, Point Of Sales (POS), etc.

According to an embodiment, examples of the electronic device may include furniture and building/structure having a communication function, electronic board, electronic signature receiving device, projector, and metering device (e.g., water, electric, gas, and electric wave metering devices). According to various embodiments, the electronic device may be any combination of the aforementioned devices. According to various embodiments of the present disclosure, the electronic device may be a flexible device. It is obvious to those skilled in the art that the electronic device is not limited to the aforementioned devices.

FIG. 1 is a diagram illustrating a network environment including electronic devices. Referring to FIG. 1, the electronic device 101 may include a bus 110, a processor 120, a memory 130, an input/output interface 140, a display 150, a communication interface 160, and a communication service control module 170.

The bus 110 connects the aforementioned components to each other and may be a circuit for exchanging signals (e.g., control messages) among the components.

For example, the processor 120 receives a command from any of the aforementioned components (e.g., memory 130, input/output interface 140, display 150, communication interface 160, and communication service control module 170) through the bus 110, interprets the command, and executes operations or data processing according to the decrypted command.

The memory 130 may store the command or data received from the processor 120 or other components (e.g., input/output interface 140, display 150, communication interface 160, communication service control module 170, etc.) or generated by the processor 120 or other components. The memory 130 may store program modules including kernel 131, middleware 132, Application Programming Interface (API) 133, applications 134, etc. Each programing module may be implemented as software, firmware, hardware, and any combination thereof.

The kernel 131 may control or manage the system resources (e.g., bus 110, processor 120, and memory 130) for use in executing the operation or function implemented with the middleware 132, the API 133, or the application 134. The kernel 131 also may provide an interface allowing the middleware 132, API 133, or application 134 to access the components of the electronic device 101 to control or manage.

The middleware 132 may work as a relay of data communicated between the API 133 or application 134 and the kernel 131. The middleware 132 may execute control of the task requests from the applications 134 in such a way of assigning priority for use of the system resource (e.g., bus 110, processor 120, and memory 130) of the electronic device to at least one of the applications 134.

The API 133 is the interface for the applications 134 to control the function provided by the kernel 131 or the middleware 132 and may include at least one interface or function (e.g., command) for file control, window control, image control, or text control.

The electronic device 101 may further include a Subscriber Identity Module (SIM) card (not shown). The SIM card may be a card including the SIM and that is inserted into a slot formed at a specific part of the electronic device. The SIM card may include unique identity information (e.g., Integrated Circuit Card Identifier (ICCID)) or subscriber information (e.g., International Mobile Subscriber Identity (IMSI)).

In an embodiment, the electronic device may include one or more slots for receiving SIM cards. The electronic device may communicate with another electronic device using the identity information contained in the SIM card.

The SIM card may include unique identity information (e.g., ICCID, IMSI, and Mobile Station International IDSN number (MSISDN)).

The IMSI is the unique identity information stored in the SIM for use in all communication networks, and examples of the IMSI include Mobile Country Code (MCC), Mobile Network Code (MNC), and Mobile Station Identifier Number (MSIN). The MCC and MNC may be used for identifying the communication network to which the user of the electronic device is subscribed. The MSISDN is the unique identity information for the communication network to identify a subscriber and may include the country code, National Destination Code (NDC), and Subscriber Number (SN). The IMSI and MSISDN may be used for identifying a subscriber. The IMSI may be used for identifying an electronic device while the MSISDN may be used for providing the user of the electronic device with the communication service. For example, the MSISDN may be a unique number of the electronic device (e.g., phone number) which can be changed through registration with a communication network.

The input/output interface 140 delivers the command or data input by the user with an input/output device (e.g., sensor, keyboard, and touchscreen) to the processor 120, memory 130, communication interface 160, and/or communication service control module 170 through the bus 110. For example, the input/output interface 140 may provide the processor 120 with the data corresponding to the touch made by the user on the touchscreen. The input/output interface 140 may output the command or data (which is received from the processor 120, memory 130, communication interfaced 160, or the communication service control module 170 through the bus 110) through the input/output device (e.g., speaker and display). For example, the input/out interface 140 may output the voice data processed by the processor 120 to the user through the speaker.

The display 150 may present various information (e.g., multimedia data and text data) to the user.

The communication interface 160 may establish a communication connection of the electronic device 101 with an external device (e.g., electronic device 104 and server 106). For example, the communication interface 160 connects to the network 162 through a wireless or wired link for communication with the external device. Examples of the wireless communication technology may include wireless fidelity (Wi-Fi), Bluetooth (BT), Near Field Communication (NFC), Global Positioning System (GPS), and cellular communication technology (e.g., Long Term Evolution (LTE), LTE-Advanced (LTE-A), Code Division Multiple Access (CDMA), Wideband CDMA (WCDMA), Universal Mobile Telecommunication System (UMTS), Wireless-Broadband (WiBro), and General System for Mobile communications (GSM)). Examples of the wired communication technology may include Universal Serial Bus (USB), High Definition Multimedia Interface (HDMI), Recommended Standard 232 (RS-232), and Plain Old Telephone Service (POTS).

According to an embodiment of the present disclosure, the network 162 may be a telecommunication network. Examples of the communication network may include a computer network, the Internet, the Internet of Things, and a telephony network. According to an embodiment of the present disclosure, the protocols for communication between the electronic device 101 and an external device (e.g., transport layer protocol, data link layer protocol, and physical layer protocol) may support at least one of the applications 134, the application programing interface 133, the middleware 132, the kernel 131, and the communication interface 160.

The processor 120 may control the operations of configuring and releasing the function of forwarding a call to another electronic device (e.g., incoming call and/or message forwarding function).

Although FIG. 1 exemplifies a case where the processor 120 and the communication service control module 170 are implemented separately, it may also be possible to implement the processor 120 to control the functions of the communication service control module 170.

Figure 2:
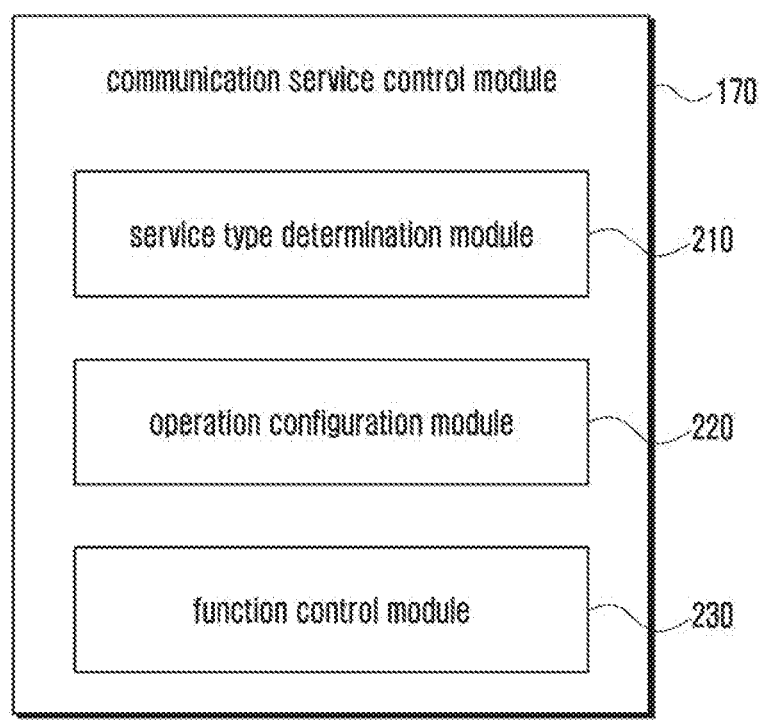
FIG. 2 is a block diagram illustrating a configuration of the communication service control module of the electronic device according to various embodiments of the present disclosure.

FIG. 2 is a block diagram illustrating a configuration of the communication service control module of the electronic device according to various embodiments of the present disclosure.

Referring to FIG. 2, the communication service control module 170 may include a service type determination module 171, an operation configuration module 172, and a function control module 173.

The service type determination module 171 may identify the operator providing a communication service and determine the type of the call forwarding service which the operator provides to the user who uses at least two electronic devices.

According to an embodiment, the call forwarding service may be categorized into four types: a first service type supporting supplementary service-based communication service, a second service type supporting the communication service allowed only for a configured primary device, a third service type supporting the communication service allowed for both of electronic devices, and a fourth service type supporting the communication service in which an operator network provides the call forwarding service. The operators may support different types of services without limitation to the aforementioned service types. For example, the service may be country-specific as shown in the table of FIG. 4.

The operation configuration module 172 sets up the electronic device to operate in adaptation to the service type of the operator and configures the call forwarding function to be turned on/off according to the settings. For example, the operation configuration module 172 may configure the User Interface (UI) differently depending on whether the electronic device is receiving a one number service or a two-number service such that the electronic device operates with the service-specific UI.

For example, the multi-device communication services may be categorized into two types: one-number service and two-number service. The one-number service is characterized in that a subscriber is allowed to use multiple electronic devices with a single phone number for communication. The two-number service is characterized in that a subscriber is allowed to receive multiple communication services using a single device with multiple phone numbers stored in the SIM card(s). In the case of using the one-number service, because an electronic device should be allowed to receive a call addressed to another electronic device, it may be necessary to configure settings for call forwarding service request to a communication network.

The one-number service-enabled electronic device may operate in one of a stand-alone mode or a companion mode. For example, if the electronic device is a wearable device connected to a host device, the stand-alone mode is the operation mode in which the wearable device uses the identity information of the host device instead of the identity information stored in its SIM card while the host device is configured for call forwarding to the wearable device. The companion mode is the operation mode in which the wearable device is paired with the host device such that the host device uses the communication function of the wearable device while the wearable device is configured for call forwarding to the host device.

The function control module 173 may determine whether the call forwarding service enable/disable condition is fulfilled in the one-number service-enabled electronic device and, if so, turns on/off the call forwarding service according to the configured operation settings. The control function module 173 may determine whether the call forwarding service enable/disable condition is fulfilled based on the electronic device movement information and information on the connection state with another electronic device.

According to various embodiments, the electronic device may include a communication unit for communication with another electronic device; a storage unit for storing service type per communication service and operation information; and a control unit for identifying the communication service information, determining service type corresponding to the identified information, and controlling, when the call forwarding service enable/disable condition is fulfilled, enabling/disabling the call forwarding service in adaptation to the service type.

The electronic device may also include at least one SIM; and the control unit may acquire information on the communication service based on the country information and network information stored in the SIM, check the service type mapped to the identified communication service based on the information stored in the storage unit, and control the electronic device to transmit the call forwarding service enable/disable request to a server supporting the communication service based on the service type-specific subscriber identity information.

In the case of the call forwarding service function for supporting the communication service using one identity number shared with another electronic device, the control unit may control to enable/disable the call forwarding service.

The control unit may determine whether the call forwarding enable/disable condition is fulfilled based on the short range communication link connection status with another electronic device, movement of the electronic device, and movement of another electronic device.

The control unit may control to enable the call forwarding service function when the subscriber identity information of the electronic device and the subscriber identity information of another electronic device match or when a user input for call forwarding service function is detected.

The control unit may check the type of the electronic device and, when the electronic device is a wearable device, enable the call forwarding function to receive the call forwarded by the host electronic device through a short range communication link upon detection of a short range communication link connection and disable the call forwarding function to receive the call by means of the host electronic device upon detection of a short range communication link connection release and, when the electronic device is the host device, disable the call forwarding function upon detection of the short range communication link connection and enable the call forwarding function upon detection of the short range communication link connection release.

If the electronic device is a wearable device connected to a host device through a short range communication link and if a call forwarding enable condition is fulfilled, the control unit may control to turn off the function of the communication unit.

The control unit may set up the electronic device to enable or disable the call forwarding function in an operation mode mapped to the determined service type.

The control unit may execute the call forwarding function differently depending on the service type, i.e., the first service type supporting supplementary service-based communication service, the second service type supporting the communication service allowed only for a configured primary device, the third service type supporting the communication service allowed for both the electronic devices, and the fourth service type supporting the communication service in which an operator network provides the call forwarding service.

FIG. 3 is a flowchart illustrating a call forwarding method of an electronic device according to various embodiments of the present disclosure. For explanatory convenience, it is assumed that the processor 120 controls the functions of the communication service control module 170.

Referring to FIG. 3, the processor 120 (or the communication service control module 170) establishes a connection to a communication network providing a communication service at operation 210. The processor 120 identifies the communication network to which the electronic device is subscribed at operation 220. For example, the electronic device may identify the communication network to which the user is subscribed based on the IMSI stored in the SIM card. The IMSI may be composed of Mobile Country Code (MCC), Mobile Network Code (MNC), and Mobile Station Identity Number (MSIN). The electronic device may identify the communication network based on the MCC and MNC.

The processor 120 determines the call forwarding service type supported by the identified communication network at operation 230. For example, the processor 120 may determine the call forwarding service type based on the operator-specific identity code information and the information mapped to the service type.

According to an embodiment, the electronic device may have the operator identity code information and service type mapping information (hereinafter, referred to as operator-specific service type table). The operator-specific service type table is a table used to present the operator-specific communication services and operator-specific service types. The operator-specific service type table is a table used to present the operator identity information, call forwarding information, multi-SIM supportability information, and call forwarding service type information. The operator-specific service type table may be implemented in the form as shown in the table of FIG. 4 but, without limitation thereto, may include information on operators providing communication service all over the world.

The processor 120 sets up the call forwarding enable/disable function to operate in a mode mapped to the service type of the communication network at operation 240. For example, if the communication network supports the first type call forwarding service, the processor 120 may set up the call forwarding enable/disable function corresponding to the first type forwarding service. Also, the processor 120 may set up the call forwarding enable/disable function according to one of the first service type supporting supplementary service-based communication service, the second service type supporting the communication service allowed only for a configured primary device, the third service type supporting the communication service allowed for both the electronic devices, and the fourth service type supporting the communication service in which an operator network provides the call forwarding service.

The processor 120 detects the fulfilment of the condition for call forwarding service enable/disable condition at operation 250. The processor 120 may determine whether the call forwarding service enable/disable condition is fulfilled based on the connection status of another electronic device, user input, and electronic device movement information. In this case, the electronic device may operate in the one-number service mode, and the one-number service mode determination operation is described later with reference to FIG. 4.

In the one-number service mode, the user may carry two electronic devices such that one electronic device may be used to receive the communication service for the other electronic device. The user who has the two electronic devices may carry just one (e.g., wearable device) of the two electronic devices. The processor 120 checks the device which is in use for receiving the communication service based on the connection status with another electronic device, movement information, and whether the wearable device is being worn and detects the fulfilment of the call forwarding service enable/disable condition.

Alternatively, if a user input for call forwarding service enable/disable request to another electronic device is detected, the processor 120 determines that the call forwarding service enable/disable condition is fulfilled.

The processor 120 may configure the incoming call forwarding function to operate in correspondence with the service type according to the user input. For example, the processor 120 may configure the call forwarding function enable/disable UI for the operation mode corresponding to the service type and present the UI to the user. Since the call forwarding function enable/disable operation mode is determined depending on the service type, the electronic device may configure the UI for the operation mode corresponding to the determined service type. The operation mode per service type of the communication network is described later with reference to FIG. 4.

The processor 120 performs the call forwarding function enable/disable operation in the operation mode corresponding to the service type in response to the detection of the call forwarding service enable/disable condition at operation 260. The service type-specific operation modes are described later with reference to FIGS. 6 to 9.

FIG. 4 is a diagram exemplifying a table mapping operator identity codes and service types according to various embodiment of the present disclosure.

Referring to FIG. 4, the operators supporting communication services may be sorted according to the types of the call forwarding services they support. The electronic device may operate in a call forwarding mode determined depending on the service type and operator of each country. For example, the electronic device categorized into the first type operates in the one-number service mode corresponding to the first type call forwarding service and, likewise, the electronic devices categorized into the second, third, and fourth types operate in the one-number service modes corresponding to the second to fourth type call forwarding services, respectively.

In FIG. 4, the CF type field denotes the call forwarding type of the communication service of the operator and indicates one of the first type for supporting the call forwarding function in the form of a supplementary service through an operator network, the second type for providing the call forwarding service to only a configured device, the third type for providing the call forwarding service to both the two electronic devices, and the fourth type for the operator to provide the call forwarding service through the operator's network. The Country field denotes the country corresponding to the service type, and the Operator field denotes the operator supporting the country-specific communication service. The MCC/MNC field denotes the country and operator identity information. The electronic device may check the operator providing the communication service and the country of the operator based on the MCC/MNC stored in the SIM card. The Multi-SIM field denotes the information indicating whether Multi-SIM communication service is supported, and the remark field denotes the characteristics of the communication service supported by the operator of the country.

The electronic device may determine whether the multi-SIM communication service is available based on whether the services are provided with the SIM cards storing the same information of at least part of the MSISDN. If the multi-SIM communication is not supported, this may be the case where at least two electronic devices having the respective SIM cards storing different MSISDNs are in use.

According to an embodiment of the present disclosure, the Korean operators which do not support the multi-SIM service, such as SKT or KT, allow a user to use two electronic devices having the respective SIM cards storing different MSISDNs.

Figure 6:
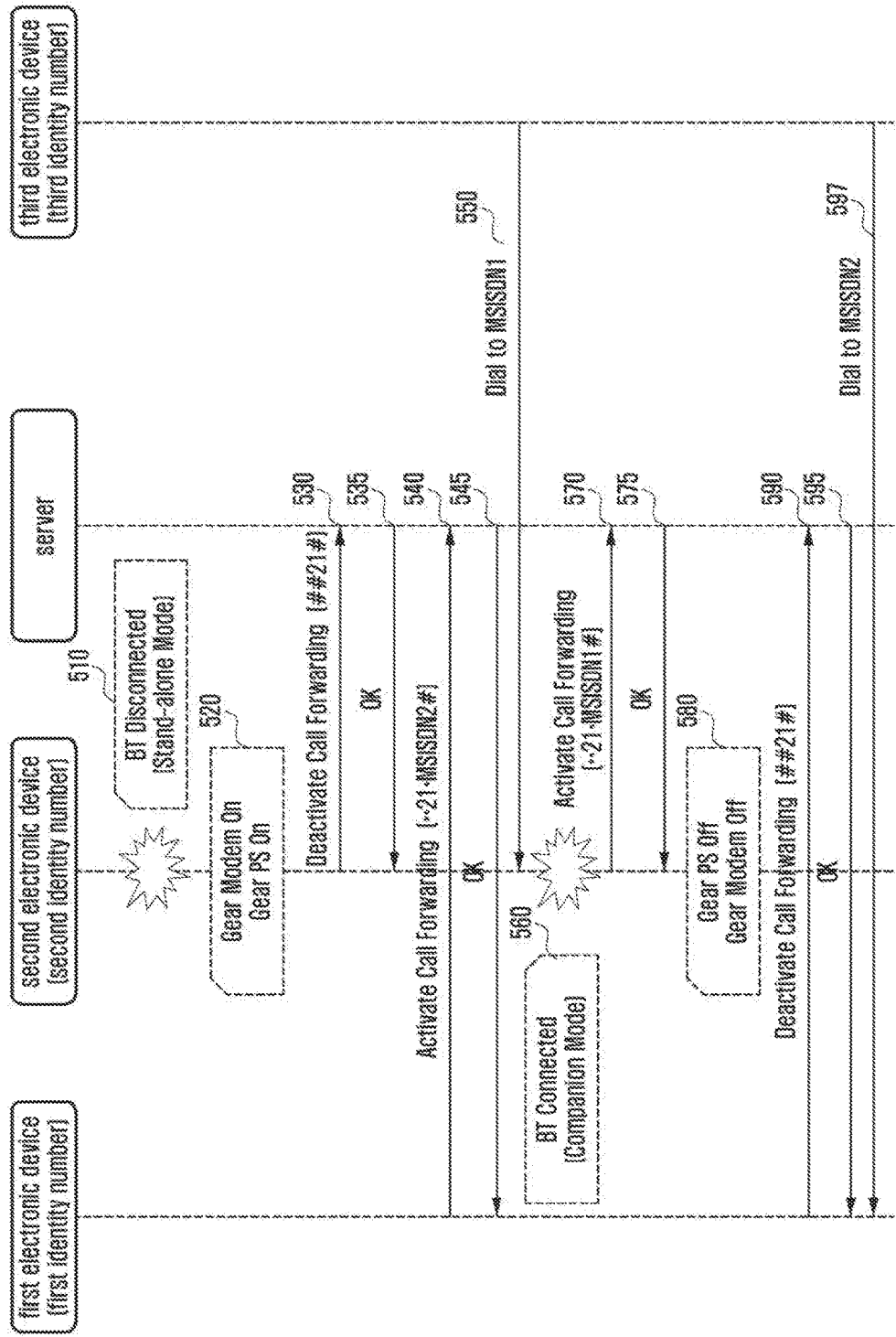
FIG. 6 is a signal flow diagram illustrating a method for call forwarding between electronic devices according to an embodiment of the present disclosure.

In the case of using the Korean operator SKT which does not support the multi-SIM service, the electronic device determines that the service type of the communication network is the first type and configures the call forwarding enable/disable function designated for the first type service (e.g., the operation procedure of FIG. 6).

Assuming the first electronic device as the host device and the second electronic device as a connected device (e.g., wearable device), the first and second electronic devices may have the respective SIM cards storing device-specific MSISDNs. If the second electronic device releases the connection with the first electronic device and turns on the communication module (e.g., modem) for establishing a connection with a communication network and the data network function (e.g., packet transmission/reception function) according to the operation mode corresponding to the first type service, it may request to a server for disabling the call forwarding service while the first electronic device may request to the server for enabling the call forwarding service. Then, the call addressed to the first electronic device may be forwarded to the second electronic device. If the second electronic device is connected back to the first electronic device, the second electronic device may request to the server for disabling the call forwarding service. If the communication module (e.g., modem) for connection to the communication network and the data network function (e.g., packet transmission/reception function) of the second electronic device are turned off, the first electronic device may request to the server for disabling the call forwarding function. Then the call addressed to the second electronic device may be forwarded to the first electronic device. The operation corresponding to the first type service is described later in detail with reference to FIG. 6.

Figure 9:
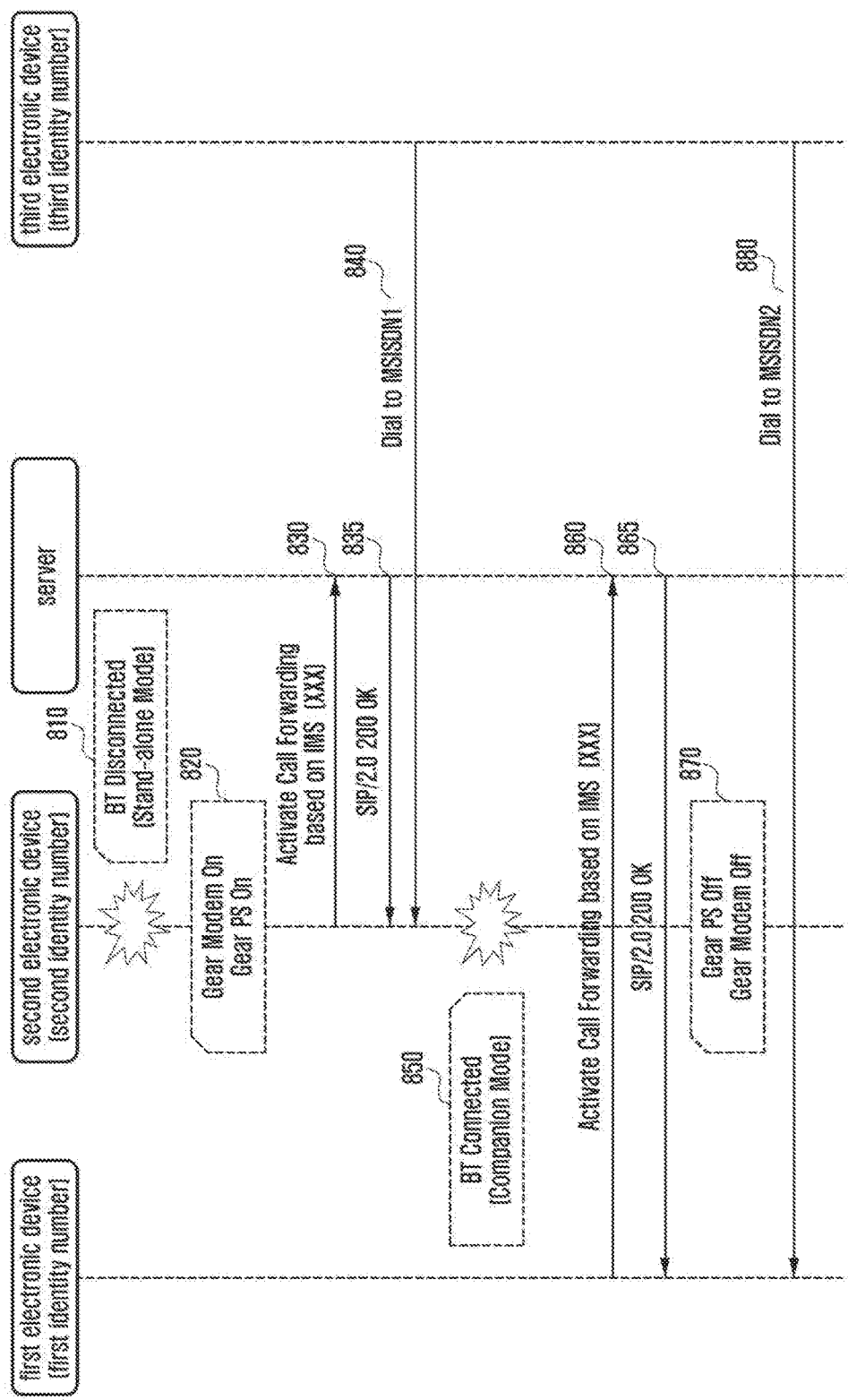
FIG. 9 is a signal flow diagram illustrating a method for call forwarding between electronic devices according to another embodiment of the present disclosure.

In the case of using the Korean operator KT which does not support the multi-SIM service, the electronic device determines that the service type of the communication network is the fourth type and configures the call forwarding enable/disable function designated for the fourth type service (e.g., operation procedure of FIG. 9). Assuming the first electronic device as the host device and the second electronic device as a connected device (e.g., wearable device), the first and second electronic devices may have the respective SIM cards storing device-specific MSISDNs.

If the communication module (e.g., modem) and the data network function (e.g., packet transmission/reception function) of the second electronic device are turned on in accordance with the operation mode corresponding to the fourth type service, the first and second electronic devices may send a server the call forwarding service activation information of the second electronic device on the basis of IP Multimedia Subsystem (IMS). Then, the call addressed to the first electronic device may be forwarded to the second electronic device. If the communication module and data network function of the second electronic device are turned off afterward, the first and second electronic devices may send the server the call forwarding activation information of the first electronic device on the basis of IMS. Then the call forwarding to the second electronic device is released such that the first electronic device receives the call. The operation corresponding to the fourth type service is described later in detail with reference to FIG. 9.

According to an embodiment of the present disclosure, in the case of the SIM card of the operator supporting the multi-SIM service, the MSISDNs of the SIMs match in part so as to make it possible to receive operator-specific voice call services.

In the case of Singaporean operators (such as SingTel, StarHub, and M1), a Malaysian operator (Maxis), and Thai operators (such as AIS and DTAC), an electronic device equipped with a Primary SIM which is selected among the electronic devices having the SIM cards supporting the multi-SIM service rings when an incoming voice call is detected and, if it is determined that the user cannot receive the voice call by means of the primary SIM-equipped electronic device, the call may be forwarded to the secondary SIM-equipped electronic device. Accordingly, the electronic device which is connected to one of the Singaporean SingTel, StarHub, and M1; the Malaysian Maxis; or one of the Thai AIS and DTAC determines that the service type of the operator network is the second type and operates the one-number service differently depending on which electronic device has the primary SIM based on the operation mode corresponding to the second type service. The primary SIM request may be generated with a value determined differently depending on the operator. The primary SIM configuration request value may be set to *141# for the Singaporean operator SingTel, *118# for another Singaporean operator StarHub, and *136# for still another Singaporean operator M1. The primary SIM configuration request value may vary depending on the operator. The primary SIM configuration request value may be set to *134*1*0000# for the Malaysian operator Maxis, 100# for the Thai operator AIS, and *128# for another Thai operator DTAC.

Assuming the first electronic device as the host device and the second electronic device as a connected device (e.g., wearable device) connected to the first electronic device and the SIM of the second electronic device as the primary SIM, if the communication module (e.g., modem) and data network function (e.g., packet transmission/reception function) of the second electronic device are turned off, the second electronic device may send the server or the network a primary SIM change request according to the operation mode corresponding to the second type service. The operation mode corresponding to the second type service is described later in detail with reference to FIG. 7.

In the case of the Italian operator Vodafone and German operator O2, an electronic device equipped with the primary SIM rings when an incoming voice call is detected and, if it is determined that the user cannot receive the voice call by means of the primary SIM-equipped electronic device, the call may be forwarded to the secondary SIM-equipped electronic device. The electronic device which is connected to one of the Italian operator Vodafone and the German operator O2 determines that the service type of the operator is the third type and may operate the one-number service in the operation mode (e.g., the operation procedure of FIG. 8) corresponding to the third type service.

Assuming the first electronic device as the host device and the second electronic device as a connected device (e.g., wearable device) connected to the first electronic device, the second electronic device may turn off the communication module (e.g., modem) and the data network function (e.g., packet transmission/reception function). In the case that the SIM attached to the second electronic device is designated as the primary SIM, the second electronic device may turn on the communication module (e.g., modem) and the data network function (e.g., packet transmission/reception function).

In the case of Spanish operators (such as Telesonic, Vodafone, and Orange) and German operators (such as Vodafone and DT), the electronic devices equipped with the SIMs supporting multi-SIM service may ring simultaneously when an incoming voice call is received. The electronic device connected to one of Spanish Telefonica, Vodafone, and Orange or one of German Vodafone and DT determines that the service type of the operator is the third type and may operate the one-number service in the operation mode (e.g., operation procedure of FIG. 8) corresponding to the third type service. The operation mode corresponding to the third type service is described later in detail with reference to FIG. 8.

Figure 5:
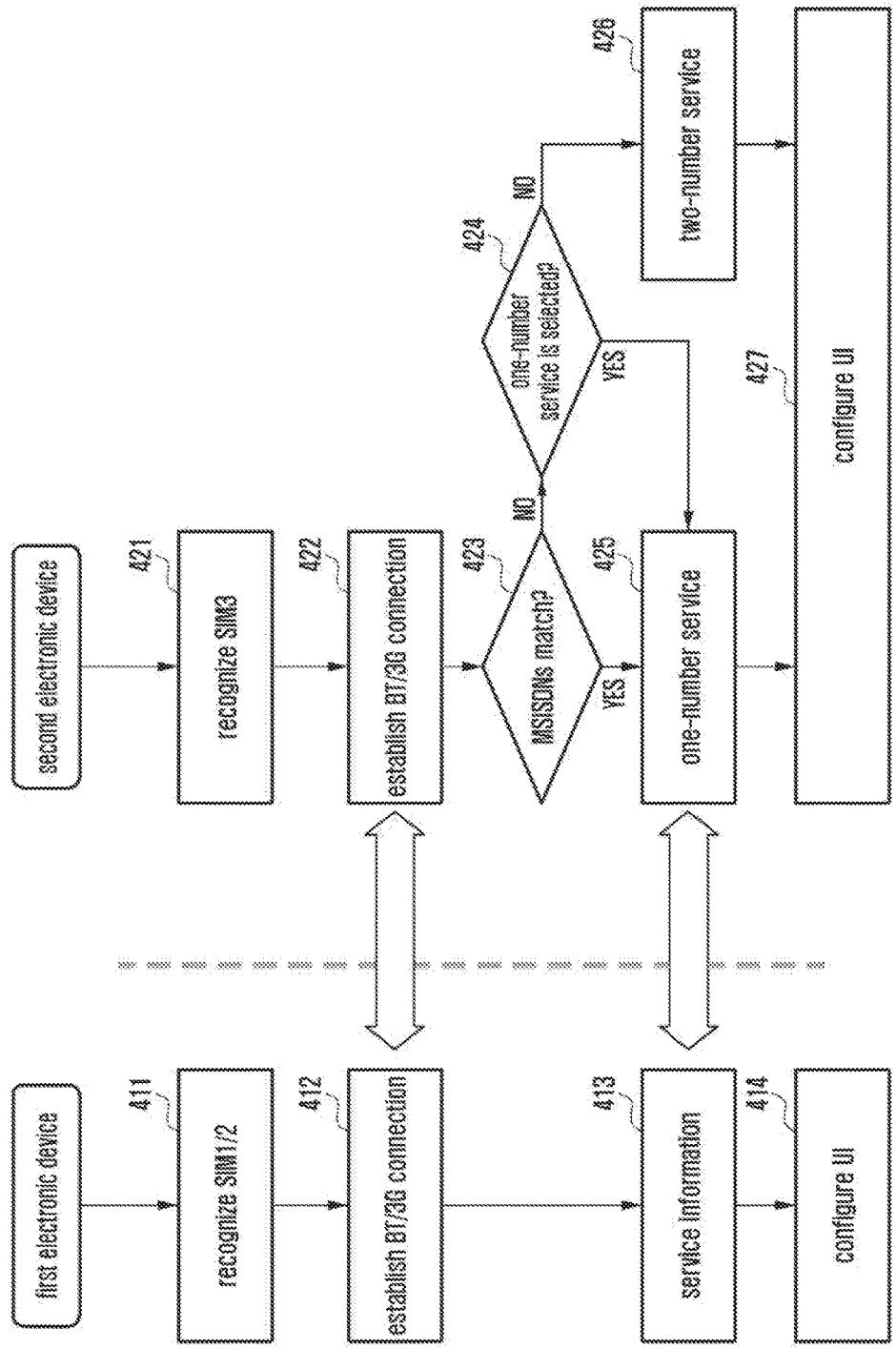
FIG. 5 is a diagram illustrating a communication service checking procedure between two electronic devices according to various embodiments of the present disclosure.

Although FIG. 5 shows a communication service checking procedure between two electronic devices, it is just an example and is not used for limiting the present disclosure.

FIG. 5 is a diagram illustrating a communication service checking procedure between two electronic devices according to various embodiments of the present disclosure.

Referring to FIG. 5, the first electronic device can hold one or more SIM cards, and the second electronic device can hold one SIM card. For example, the first (or second) electronic device may be a host device (e.g., mobile terminal) while the second (or first) electronic device may be an accessory device (e.g., wearable device).

The first electronic device recognizes at least one of SIM1 and SIM2 at operation 411. If one SIM card is inserted, the first electronic device recognizes the SIM card as SIM1; if two SIM cards are inserted, the first electronic device recognizes them as SIM1 and SIM2. The first electronic device connects to a communication network and establishes a short range communication link with the second electronic device at operation 412. The second electronic device recognizes SIM3 at operation 421 and connects to a communication network and establishes the short range communication link with the first electronic device at operation 422. For example, the first and second electronic devices search for electronic devices in their short range communication ranges and perform an authentication process with the found electronic devices to be paired with each other. The electronic devices may be connected to each other using a short range communication technology such as Wireless Fidelity (Wi-Fi), Bluetooth (BT), and near Field Communication (NFC). For example, an electronic device may receive the subscriber identity information of the other electronic device though a pairing procedure.

For example, the first and second electronic devices exchange their subscriber identity information (MSISDN, MCC/MNC, number of SIMs, and other information) for use in determining an available bidirectional call forwarding scheme.

If the short range communication link is established between the first and second electronic devices, the second electronic device determines whether the subscriber identity information (e.g., MSISDN of the SIM card) of the first electronic device matches its own subscriber identity information at operation 423. For example, the second electronic device checks the MSISDN stored in the SIM card (e.g., SIM1 and SIM2) of the first electronic device when the short range communication link is established and determines whether the MSISDN matches the MSISDN stored in its SIM card (e.g., SIM3).

If the subscriber identity information of the first and second electronic devices matches, the second electronic device activates the one-number service function. The second electronic device notifies the first electronic device of the activation of the one-number service function.

If the subscriber identity information of the first and second electronic devices does not match, the second electronic device determines whether a user input for activating the one-number service function is detected at operation 424.

For example, if the subscriber identity information of the two electronic devices does not match, this means that the two electronic devices use different phone numbers for communication. In the case of the communication network supporting the two-number service, it may be allowed to enable/disable the bidirectional call forwarding between the two electronic devices for supporting the one-number service. If the user wants to receive the communication service using multiple electronic devices with one phone number, it may be possible to request for the one-number service through a setting menu of the electronic device. If a user input for the one-number service function activation request is detected, the second electronic device notifies the first electronic device of the activation of the one-number service function.

If no user input is detected, the second electronic device activates the two-number service function for supporting the communication services with subscriber identity information of the two at operation 426. The second electronic device notifies the first electronic device of the activation of the two-number service function.

The second electronic device configures the UI for interaction with the user in the one-number service mode or the two-number service mode and presents the UI to the user at operation 427. The first electronic device configures the UI for interaction with the user in the one-number service or the two-number service as informed by the second electronic device and presents the UI to the user at operation 414.

In an embodiment, the first and second electronic devices may configure their user interfaces differently depending on the service type determined according to the procedure of FIG. 2 and depending on the type of the accessory device or the host device.

According to various embodiments, the function execution method of an electronic device may include checking the information on the communication service, determining the communication service type corresponding to the checked information, preparing a call forwarding operation mode corresponding to the service type, and enabling/disabling the call forwarding to another electronic device when a call forwarding operation enable/disable condition is fulfilled.

The information on the communication service may be obtained based on the country information and network information included in the identity information of the electronic device, and the service type may be determined based on the communication service information acquired based on the operator identity code and the information mapped to the service type.

The method may further include checking the short range communication link status with another electronic device, comparing the subscriber identity information of the electronic device with the subscriber identity information of another electronic device, and activating the call forwarding service function when the subscriber identity informs of the two electronic devices that match each other.

The method may further include detecting, when the subscriber identity information of the two electronic devices is a mismatch, a user input for call forwarding service function activation request and activating the call forwarding service function for providing the communication service with one identity number in response to the user input.

Enabling/disabling the call forwarding operation may include determining whether a call forwarding service enable/disable condition is fulfilled based on the short range communication link status between the two electronic devices, movement information of the electronic device, and movement information of another electronic device.

If the electronic device is a wearable device, the electronic device may request to a server for enabling the call forwarding service in order to receive the call addressed to another electronic device connected through a short range communication link upon detection of the establishment of the short range communication link or for disabling the call forwarding service in order to forward the call to the other electronic device upon detection of the release of the short range communication link.

If a short range communication link is established with another electronic device and if a call forwarding enable condition is fulfilled, the function of the communication unit may be turned off.

In the call forwarding enable/disable operation, if the electronic device is the host device, the host device may request to the server for disabling the call forwarding function upon detection of the establishment of the short range communication link or for enabling the call forwarding function upon detection of the release of the short range communication link.

The call forwarding enable/disable function is performed differently depending on the service type, i.e., the first type for supporting the call forwarding function in the form of a supplementary service, the second type for providing the call forwarding service to only a configured primary device, the third type for providing the call forwarding service to two electronic devices having the same identity number and supporting communication services, and a fourth type for the operator to provide the call forwarding service through the operator's network.

The call forwarding enable/disable operation may be performed based on the information about at least one of the first to fourth type services.

A description is made of the service type-based call forwarding function enable/disable operation in detail hereinafter. The call forwarding method according to various embodiments of the present disclosure may enable/disable the call forwarding function with the assistance of a server in the communication network.

FIG. 6 is a signal flow diagram illustrating a method for call forwarding between electronic devices according to an embodiment of the present disclosure.

Referring to FIG. 6, the first type call forwarding method is characterized in that an electronic device requests to the operator network for enabling/disabling the call forwarding service, which is provided in the form of a supplementary service. For example, the electronic device sends the communication network an incoming call forwarding service enable request signal (e.g., **21*phone number#), an incoming call forwarding service disable request signal (e.g., ##21#), or enquiry signal (e.g., *#21#) in order to forward the incoming call to another electronic device with the assistance of the communication network.

In the case of the communication network supporting the first type call forwarding service, the first electronic device may have the first identity information (e.g., MSISDN1) and the second electronic device may have the second identity information (e.g., MSISDN2). A counterpart electronic device may include the third identity information (e.g., MSISDN3). The server may perform call routing to a destination of the call based on the identity information. For example, the first electronic device may be a host electronic device (e.g., mobile terminal) and the second electronic device may be an accessory device (e.g., wearable device). The first and second electronic devices may activate a call forwarding to forward the call for the first electronic device to the second electronic device (host-to-wearable call forwarding) or to forward the call for the second electronic device to the first electronic device (wearable to host call forwarding).

The first electronic device detects disconnection of the short range communication link with the second electronic device at operation 510. If the short range communication link is disconnected, the first and second electronic devices may operate in a stand-alone mode. In the stand-alone mode, the user may receive the one-number service with the subscriber identity number of the first electronic device.

In this case, if the first-to-second call forwarding (host-to-wearable call forwarding) enable/disable condition is fulfilled, the first electronic device enables the call forwarding service, and the second electronic device disables the call forwarding service.

The second electronic device turns on its communication module (modem) and data network function (e.g., packet transmission/reception function) for connection to the communication network to operate in the stand-alone mode at operation 520.

If call forwarding to the first electronic device is configured, the second electronic device sends the server a call forwarding service disable message (e.g., ##21# signal) at operation 530. The server sends the second electronic device a call forwarding service disable confirmation message at operation 535. The second electronic device may determine whether the call forwarding to the first electronic device is disabled successfully based on the confirmation message.

The first electronic device sends the server a message requesting for call forwarding to the second electronic device (e.g., **21MSISDN2#) at operation 540. Then the server makes configuration for forwarding the call addressed to the first electronic device to the second electronic device and sends the first electronic device a call forwarding configuration confirmation message at operation 545. The first electronic device may check the call forwarding configuration based on the confirmation message.

The counterpart electronic device makes a call based on the identity information of the first electronic device at operation 550. The server may check the call forwarding configuration based on the identity information of the first electronic device and forward the call from the counterpart electronic device to the second electronic device. Then the second electronic device receives the call addressed to the first electronic device to communicate with the counterpart electronic device.

The second electronic device detects short range communication link connection with the first electronic device at operation 560. If the short range communication link is established between the first and second electronic devices, the first and second electronic devices can operate in a companion mode. In the companion mode, it is possible to support the one-number service based on the subscriber identity information of the second electronic device. In this case, if the second-to-first call forwarding (wearable-to-host call forwarding) enable/disable condition is fulfilled, the first electronic device disables the call forwarding service, and the second electronic device enables the call forwarding service.

The second electronic device sends the server a message requesting for call forwarding to the first electronic device (e.g., **21*MSISDN1#) at operation 570. Then the server makes configuration for forwarding the call addressed to the second electronic device to the first electronic device and sends the second electronic device a call forwarding configuration confirmation message at operation 575. The second electronic device may check the call forwarding configuration based on the confirmation message.

The second electronic device checks that the call forwarding to the first electronic device is configured and turns off the communication module (e.g., modem) and data network function (e.g., packet transmission/reception function) for connection to the communication network to avoid unnecessary power consumption at operation 580.

The first electronic device sends the server a message requesting for disabling the call forwarding to the first electronic device (e.g., ##21# signal) at operation 590. The server sends the first electronic device a configuration release confirmation signal at operation 595. The first electronic device may check the release of the call forwarding service based on the confirmation message.

The counterpart electronic device places a call to the user based on the identity information of the second electronic device at operation 597. The server may check the call forwarding service configured with the identity information of the second electronic device and forwards the call from the counterpart electronic device to the first electronic device. Then the first electronic device receives the call addressed to the second electronic device to communicate with the counterpart electronic device.

Figure 7:
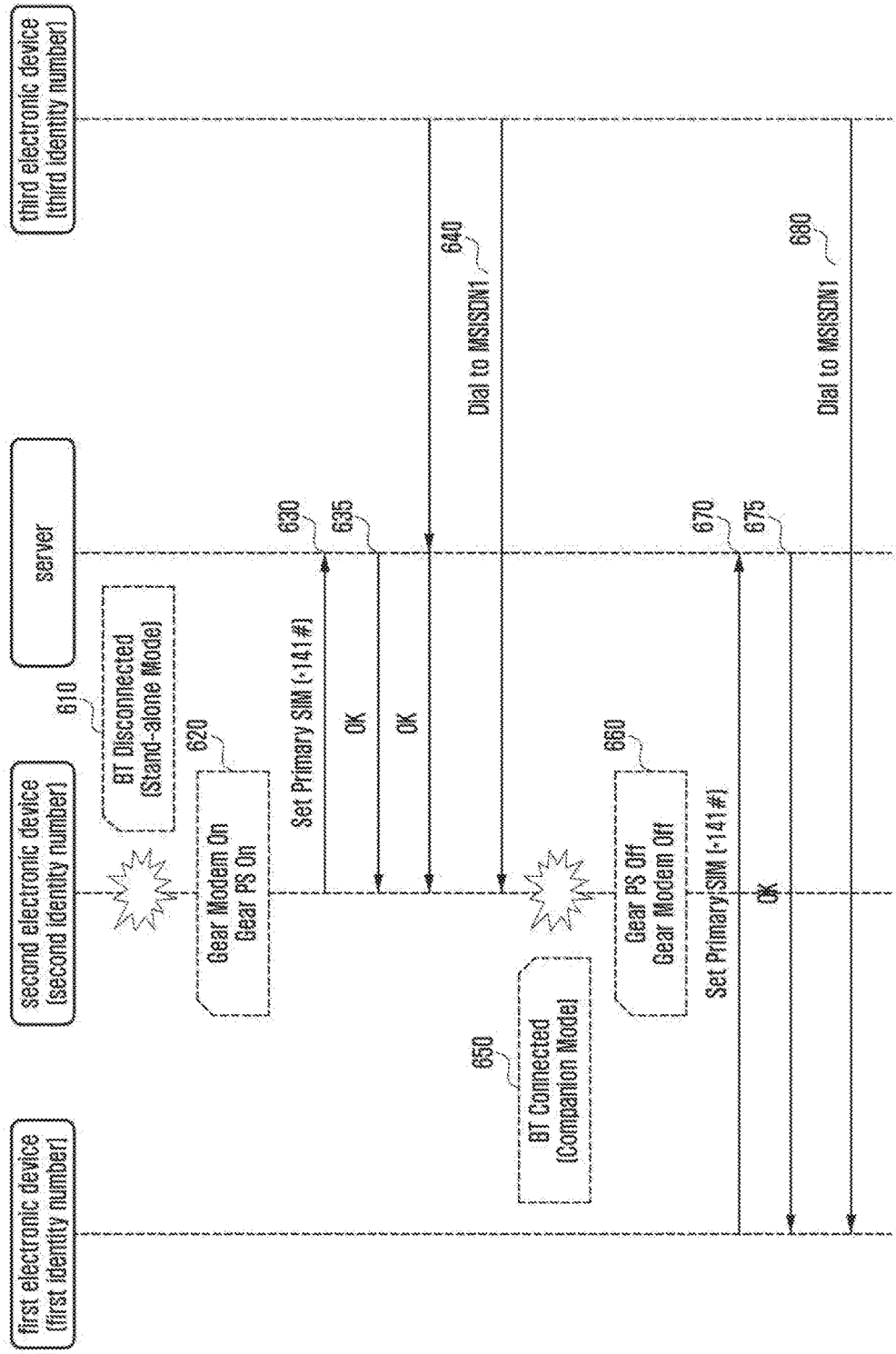
FIG. 7 is a signal flow diagram illustrating a method for call forwarding between electronic devices according to another embodiment of the present disclosure.

FIG. 7 is a signal flow diagram illustrating a method for call forwarding between electronic devices according to another embodiment of the present disclosure.

Referring to FIG. 7, the second type call forwarding method is characterized in that an incoming call is forwarded to an electronic device configured with a specific identity number and the operator supports the call forwarding function based on Unstructured Supplementary Service Data (USSD).

In the case of the communication network supporting the second type call forwarding service, the first and second electronic devices may have the same subscriber identity number (e.g., MSISDN1). The user may register one of the first and second electronic devices as a primary device with the communication network along with the corresponding SIM (e.g., primary SIM). The operator may provide the primary device with the communication service through the communication network.

In order to support the call forwarding service, it is necessary to register one of the first and second electronic devices with the communication network in order for the selected device to operate as the primary device based on the movement and wearing state of the electronic devices. For example, the first electronic device may be a host electronic device (e.g., mobile terminal) and the second electronic device may be an accessory device (e.g., wearable device).

The short range communication link between the first and second electronic devices may be disconnected at operation 610. In this case, the second electronic device may operate in the stand-alone mode and detect that a condition for registering the second electronic device as the primary device is fulfilled.

The second electronic device turns on the communication module (e.g., modem) and data network function (e.g., packet transmission/reception function) for connection to the communication network at operation 620. The second electronic device sends the server a primary device registration request message at operation 630. The primary device registration request message may be configured differently depending on the operator supporting USSD. The second electronic device may transmit the network-specific registration request message based on the country code and network code stored in the SIM card of the second electronic device. For example, the registration request message includes *141# for the Singaporean operator SingTel, *118# for another Singaporean operator StarHub, or *136# for still another Singaporean operator M1 as shown in the table of FIG. 4. The registration request message may include *134*1*0000# for the Malaysian operator Maxis, 100# for the Thai operator AIS, or *128# for another Thai operator DTAC.

The server sends the second electronic device a message confirming that the second electronic device is registered as the primary device at operation 635. The second electronic device may check that it is registered as the primary device based on the confirmation message.

The counterpart electronic device may place a call to the subscriber identity number of the first or second electronic device at operation 640. Then the server transfers the call to the primary device selected between the first and second electronic devices. The second electronic device receives the call to communicate with the counterpart electronic device.

The first and second electronic devices establish a short range communication link therebetween at operation 650. The first and second electronic devices may operate in the companion mode and detect fulfillment of the condition for registering the first electronic device as the primary device.

The second electronic device turns off the communication module (e.g., modem) and data network function (e.g., packet transmission/reception function) for connection with the communication network at operation 660.

The first electronic device sends the server a primary device registration request message at operation 670. The server registers the first electronic device as the primary device according to the registration request message from the first electronic device and sends the first electronic device a primary device registration confirmation message. The first electronic device may check that it has been registered as the primary device based on the confirmation message.

The counterpart electronic device places a call to the identity number of the first or second electronic device at operation 680. Then the server transfers the call to the first electronic device registered as the primary device. The first electronic device receives the call to communicate with the counterpart electronic device.

Figure 8:
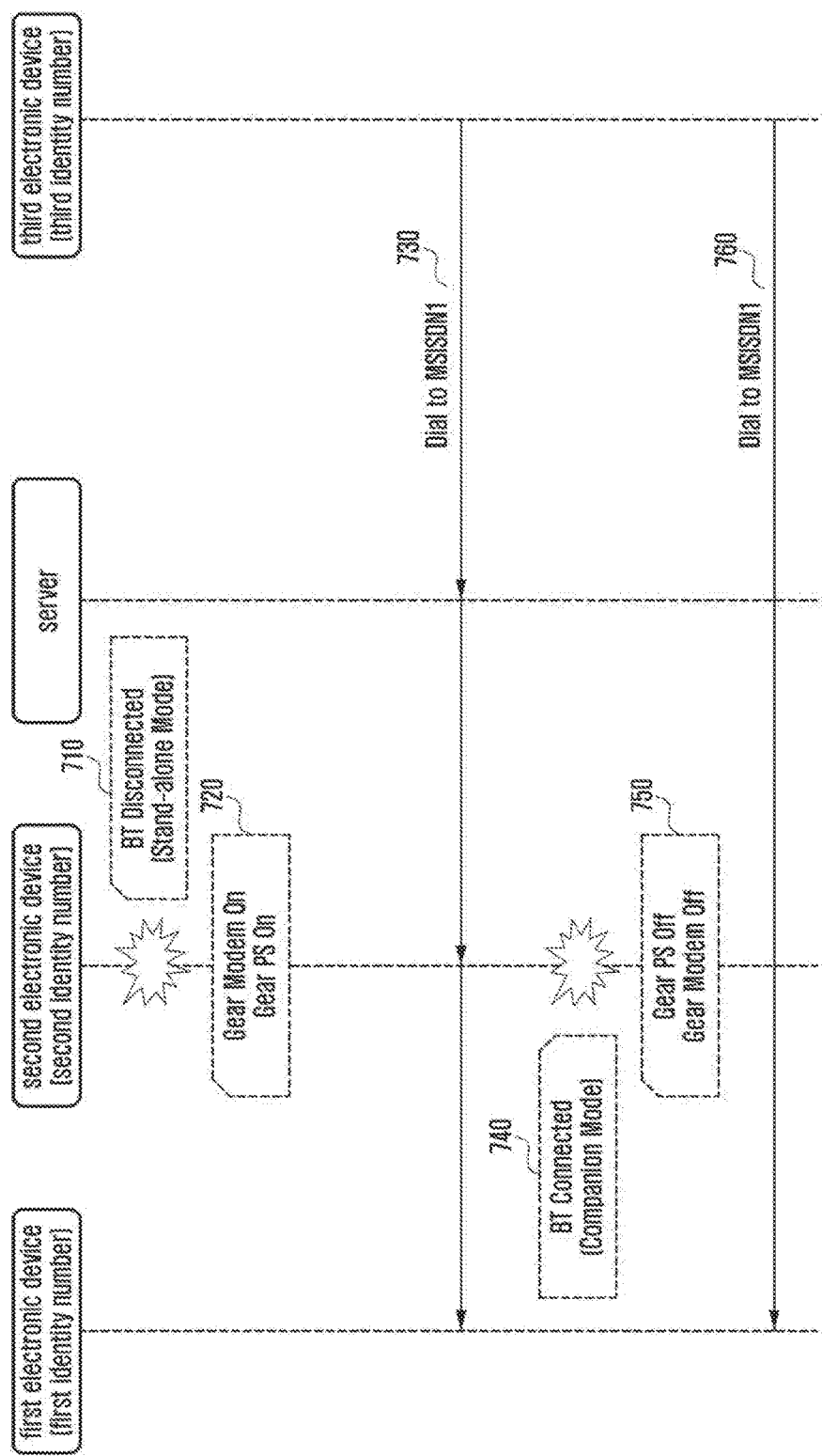
FIG. 8 is a signal flow diagram illustrating a method for call forwarding between electronic devices according to another embodiment of the present disclosure.

FIG. 8 is a signal flow diagram illustrating a method for call forwarding between electronic devices according to another embodiment of the present disclosure.

Referring to FIG. 8, the third type call forwarding method is characterized in that the two electronic devices have the same subscriber identity number for use in communication and the operator supports multi-SIM-based communication function.

In the case of the communication network supporting the third type call forwarding service, the first and second electronic devices may have the same subscriber identity number (e.g., MSISDN1). The operator may send a call connection request to the respective electronic devices having the same subscriber identity number.

According to various embodiments, the call request signal is transmitted to both the first and second electronic devices; thus, the communication function of the second electronic device may be activated/deactivated according to the short range communication link state between the first and second electronic devices.

The first and second electronic devices disconnect the short range communication link therebetween at operation 710. The second electronic device may operate in the stand-alone mode. The second electronic device turns on the communication module (e.g., modem) and data network function (e.g., packet transmission/reception function) for connection to the communication network at operation 720.

The counterpart electronic device requests for call connection using the identity information of the first and second electronic devices at operation 730. Then the server transfers the call to the first and second electronic devices.

The user may communicate with the counterpart by means of the first electronic device or the second electronic device. If the user receives the call placed to one of the first and second electronic devices, the other electronic device may present a missed call notification to the user.

The first and second electronic devices may be connected through a short range communication link at operation 740. The first and second electronic devices may operate in the companion mode.

The second electronic device turns off the communication module (e.g., modem) and data network function (e.g., packet transmission/reception function) for connection with the communication network to avoid unnecessary power consumption at operation 750.

The counterpart electronic device requests for call connection using the identity information of the first and second electronic devices at operation 760. Then the server transfers the call connection request to the first electronic device. Since the communication module and data network function of the second electronic device have been turned off, it cannot receive the call connection request transmitted by the server. The first electronic device receives the call connection request to communicate with the counterpart electronic device.

FIG. 9 is a signal flow diagram illustrating a method for call forwarding between electronic devices according to another embodiment of the present disclosure.

Referring to FIG. 9, the third type call forwarding method is characterized in that the operator network provides a call forwarding service based on the IP Multimedia Subsystem (IMS) or Rich Communication Suite (RCS).

For example, the call forwarding service can be provided in the form of an IMS-based service or a third-way service (SS, SMS, or other operator-specific service), and the Korean operator SKT supports the IMS-based call forwarding service.

In the case of the communication network supporting the fourth type call forwarding service, the first electronic device may have the first identity information (e.g., MSISDN1) and the second electronic device may have the third identity information (e.g., MSISDN2). Also, the counterpart electronic device may have the third identity information (e.g., MSISDN3). In order to support the call forwarding service, the first and second electronic devices may operate in the stand-alone mode or the companion mode according to the movement of the electronic devices and wearing status of the electronic devices.

The first and second electronic devices may release the short range communication link established therebetween at operation 810. The second electronic device may operate in the stand-alone mode. The second electronic device turns on its communication module (e.g., modem) and data network function (e.g., packet transmission/reception function) at operation 820.

The second electronic device sends the server a call forwarding request at operation 830. The server configures the call forwarding service to forward the call addressed to the first electronic device to the second electronic device at operation 835. The server sends the second electronic device a signal confirming the call forwarding service configuration at operation 840. The second electronic device checks the call forwarding service configuration based on the confirmation signal.

The counterpart electronic device makes a call connection request with the first electronic device at operation 840. The server checks the call forwarding service status of the first electronic device and may forward the call from the counterpart electronic device to the second electronic device. The second electronic device receives the call addressed to the first electronic device to communicate with the counterpart electronic device.

The first and second electronic devices establish a short range communication link therebetween at operation 850. If the short range communication link is established, the first and second electronic devices may operate in the companion mode. The first electronic device sends the server a call forwarding request upon detection of the short range communication link establishment at operation 860. The server configures the call forwarding service to forward the call addressed to the second electronic device to the first electronic device. The server sends the first electronic device a signal confirming the call forwarding service configuration at operation 865. The first electronic device checks the call forwarding service configuration based on the confirmation signal.

The second electronic device turns off its communication module (e.g., modem) and data network function (e.g., packet transmission/reception function) for connection to the communication network at operation 870.

The counterpart electronic device makes a call connection request with the identity information of the second electronic device at operation 880. The server checks the call forwarding service configured with the identity information of the second electronic device and forwards the call addressed to the second electronic device to the first electronic device. Then the first electronic device receives the call addressed to the second electronic device to communicate with the counterpart electronic device.

Figure 10:
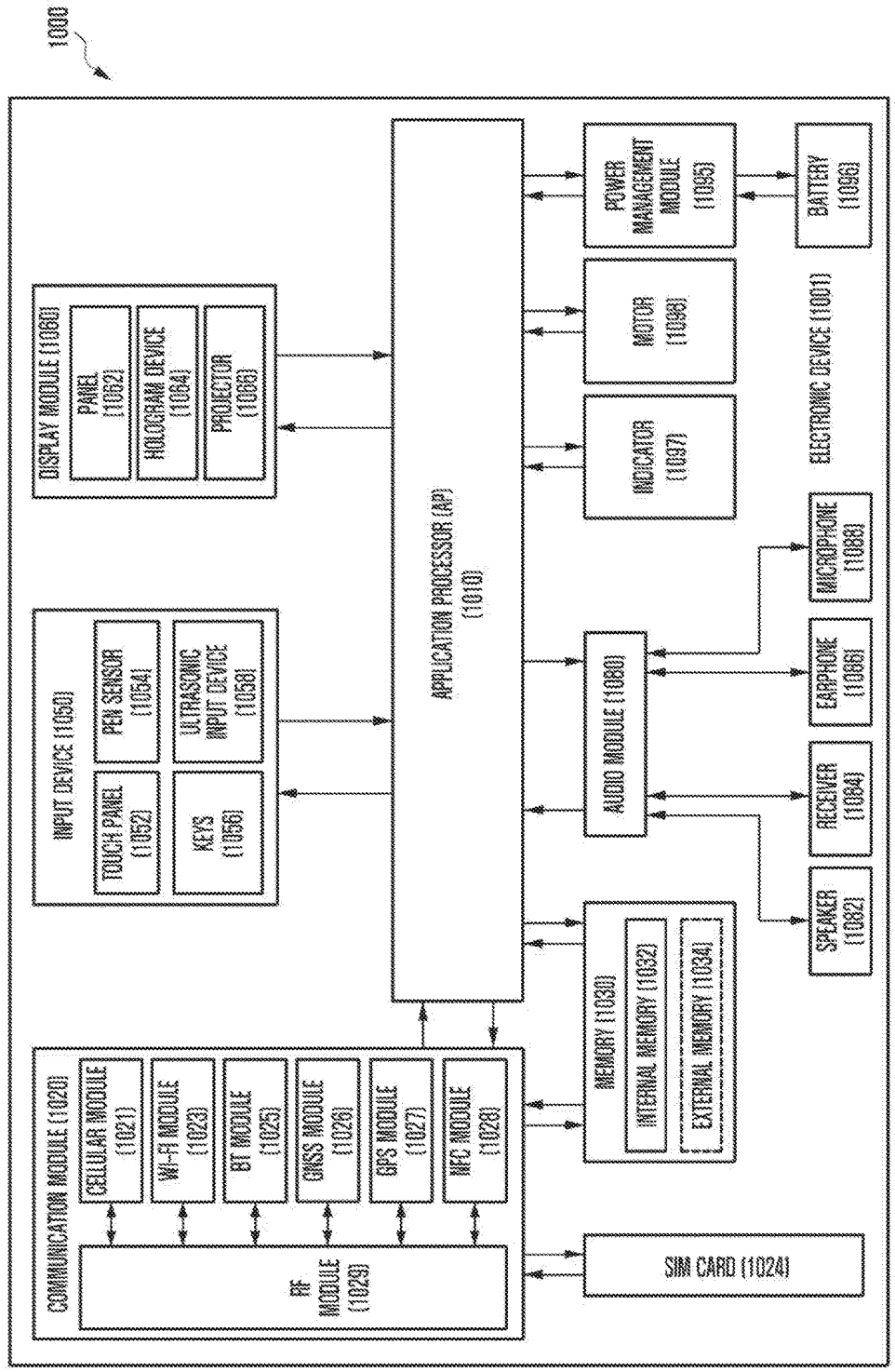
FIG. 10 is a block diagram illustrating a configuration of the electronic device according to various embodiments of the present disclosure.

FIG. 10 is a block diagram illustrating a configuration of the electronic device according to various embodiments of the present disclosure. For example, the electronic device 1000 may be a whole or part of the electronic device 101 of FIG. 1.

Referring to FIG. 10, the electronic device 1000 may include an Application Processor (AP) 1010, a communication module 1020, a Subscriber Identity Module (SIM) card 1024, a memory 1030, an input device 1050, a display 1060, an audio module 1080, a power management module 1095, and a battery 1096.

The AP 1010 may operate an Operating System (OS) and/or application programs to control a plurality of hardware and/or software components connected to the AP 1010 and perform data-processing and operations on multimedia data. For example, the AP 1010 may be implemented in the form of System on Chip (SoC). According to an embodiment, the AP 1010 may include a Graphic Processing Unit (GPU) (not shown).

The communication module 1020 (e.g., communication interface 160) may perform data communication with other electronic devices (e.g., electronic device 104 and server 106) through a network. According to an embodiment, the communication module 1020 may include a cellular module 1021, a Wi-Fi module 1023, a BT module 1025, a GPS module 1027, an NFC module 1028, and a Radio Frequency (RF) module 1029.

The cellular module 1021 is responsible for voice and video communication, text messaging, and Internet access services through a communication network (e.g., LTE, LTE-A, CDMA, WCDMA, UMTS, WiBro, and GSM networks). The cellular module 1021 may perform identification and authentication of electronic devices in the communication network using the SIM card 1024. According to an embodiment, the cellular module 1021 may perform at least one of the functions of the AP 1010. For example, the cellular module 1021 may perform at least a part of the multimedia control function.

According to an embodiment, the cellular module 1021 may include a Communication Processor (CP). The cellular module 1021 may be implemented in the form of SOC. Although the cellular module 1021 (e.g., communication processor), the memory 1030, and the power management module 1095 are depicted as independent components separated from the AP 1010, the present disclosure is not limited thereto but may be embodied in a way that the AP 1010 includes at least one of the components (e.g., cellular module 1021).

According to an embodiment, each of the AP 1010 and the cellular module 1021 (e.g., communication processor) may load a command or data received from at least one of the components on a non-volatile or volatile memory and process the command or data. The AP 1010 or the cellular module 1021 may store the data received from other components or generated by at least one of other components in the non-volatile memory.

Each of the Wi-Fi module 1023, the BT module 1025, the GPS module 1027, and the NFC module 1028 may include a processor for processing the data it transmits/receives. Although the cellular module 1021, the Wi-Fi module 1023, the BT module 1025, the GPS module 1027, and the NFC module 1028 are depicted as independent blocks; at least two of them (e.g., communication processor corresponding to the cellular module 1021 and Wi-Fi processor corresponding to the Wi-Fi module 1023) may be integrated in the form of SoC.

The SIM card 1024 may be designed so as to be inserted into a slot formed at a predetermined position of the electronic device. The SIM card 1024 may store unique identity information (e.g., Integrated Circuit Card Identifier (IC-CID)) or subscriber information (e.g., International Mobile Subscriber Identity (IMSI)).

The memory 1030 (e.g., memory 130) may include at least one of the internal memory 1032 and an external memory 1034. The internal memory 1032 may include at least one of a volatile memory (e.g., Dynamic Random Access Memory (DRAM), Static RAM (SRAM), Synchronous Dynamic RAM (SDRAM) or a non-volatile memory (e.g., One Time Programmable Read Only Memory (OTPROM), Programmable ROM (PROM), Erasable and Programmable ROM (EPROM), Electrically Erasable and Programmable ROM (EEPROM), mask ROM, flash ROM, NAND flash memory, and NOR flash memory)

According to an embodiment, the internal memory 1032 may be a Solid State Drive (SSD). The external memory 1034 may be a flash drive such as Compact Flash (CF), Secure Digital (SD), micro-SD, Mini-SD, extreme Digital (xD), and Memory Stick. The external memory 1034 may be connected to the electronic device 1001 through various interfaces functionally. According to an embodiment, the electronic device 1001 may include a storage device (or storage medium) such as hard drive.

The input device 1050 may include a touch panel 1052, a (digital) pen sensor 1054, keys 1056, and an ultrasonic input device 1058. The touch panel 1052 may be one of capacitive, resistive, infrared, microwave type touch panel. The touch panel 1052 may include a control circuit. In the case of the capacitive type touch panel, it is possible to detect physical contact or approximation. The touch panel 1052 may further include a tactile layer. In this case, the touch panel 1052 may provide the user with haptic reaction.

The (digital) pen sensor 1054 may be implemented with a sheet with the same or similar way as touch input of the user or a separate recognition sheet. The keys 1056 may include physical buttons, optical key, and keypad. The ultrasonic input device 1058 is a device capable of checking data by detecting sound wave through a microphone 1088 and may be implemented for wireless recognition. According to an embodiment, the electronic device 1001 may receive the user input made by means of an external device (e.g., computer or server) connected through the communication module 1020.

The display 1060 (e.g., display module 150) may include a panel 1062, a hologram device 1064, and a projector 1066. The panel 1062 may be a Liquid Crystal Display (LCD) panel or an Active Matrix Organic Light Emitting Diodes (AMOLED) panel. The panel 1062 may be implemented so as to be flexible, transparent, and/or wearable. The panel 1062 may be implemented as a module integrated with the touch panel 1052. The hologram device 1064 may present a 3-dimensional image in the air using interference of light. The projector 1066 may project an image to a screen. The screen may be placed inside or outside the electronic device. According to an embodiment, the display 1060 may include a control circuit for controlling the panel 1062, the hologram device 1064, and the projector 1066.

The audio module 1080 may convert sound to electric signals and vice versa. At least a part of the audio module 1080 may be included in the input/output interface 140 as shown in FIG. 1. The audio module 1080 may process the audio information input or output through the speaker 1082, the receiver 1084, the earphone 1086, and the microphone 1088.

The power management module 1095 may manage the power of the electronic device 1001. Although not shown, the power management module 1095 may include a Power Management Integrated Circuit (PMIC), a charger Integrated Circuit (IC), a battery, and a battery or fuel gauge.

The PMIC may be integrated into an integrated circuit or SoC semiconductor. The charging may be classified into wireless charging and wired charge. The charger IC may charge the battery and protect the charger against overvoltage or overcurrent. According to an embodiment, the charger IC may include at least one of wired charger and wireless charger ICs. Examples of the wireless charging technology includes resonance wireless charging and electromagnetic wave wireless charging, and there is a need of extra circuit for wireless charging such as coil loop, resonance circuit, and diode.

The battery gauge may measure the residual power of the battery 1096, charging voltage, current, and temperature. The battery 1096 may store or generate power and supply the stored or generated power to the electronic device 1001. The battery 1096 may include a rechargeable battery or a solar battery.

As described above, the electronic device operating method and apparatus of the present disclosure are capable of providing diverse screen displays in adaptation to various conditions to implement optimal environment for utilizing the electronic device, resulting in improvement of user convenience. Also, the electronic device operating method and apparatus of the present disclosure are advantageous in terms of facilitating navigation between folders by sorting the folders by hierarchical level.

The above enumerated components of the electronic device of the present disclosure may be implemented into one or more parts, and the names of the corresponding components may be changed depending on the kind of the electronic device. The electronic device of the present disclosure may include at least one of the aforementioned components with omission or addition of some components. The components of the electronic device of the present disclosure may be combined selectively into an entity to perform the functions of the components equally as before the combination.

The bidirectional communication method of an electronic device is comprised of at least one command stored in a storage medium and executable by at least one processor, the method comprising: identifying communication service information, determining communication service type corresponding to the identified information, preparing a call forwarding service mode corresponding to the service type, and performing, when a call forwarding service enable/disable condition is fulfilled, the call forwarding enable/disable operation to forward a call to a companion electronic device.

The electronic device and bidirectional call forwarding control method of the present disclosure is advantageous in terms of identifying a communication service provider and executing the call forwarding enable/disable function automatically in adaptation to the user's situation according to the operation mode corresponding to the identified provider.

Also, the electronic device and bidirectional call forwarding control method of the present disclosure is advantageous in terms of forwarding an incoming call to a companion electronic device depending on the user's situation without any user's input by enabling/disabling the call forwarding function of the electronic device based on whether the short range communication link between the devices is established.

The module or programming module of the present disclosure may include at least one of the aforementioned components with omission of some components or addition of other components. The operations of the modules, programming modules, or other components may be executed in series, in parallel, recursively, or heuristically. Also, some operations may be executed in different order, omitted, or extended with other operations.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
 a communication unit configured to communicate with other electronic devices;
 a storage unit configured to store service type and operation mode information per communication service; and
 a control unit configured to:
  check information on the communication service;
  determine a service type corresponding to the communication service information; and
  control a call forwarding function to enable/disable call forwarding to a companion electronic device in an operation mode corresponding to the determined service type,
 wherein the service type corresponding to the communication service information comprises a first service type supporting supplementary service-based communication service, a second service type supporting the communication service allowed only for a configured primary device, a third service type supporting the communication service allowed for both the electronic devices, and a fourth service type supporting the communication service in which an operator network provides the call forwarding service.

2. The electronic device of claim 1, further comprising at least one subscriber identity module, wherein the control unit is configured to check the communication service information based on country information and network information stored in the subscriber identity module, determine the service type mapped to the communication service information, and transmit to a server supporting the communication service a call forwarding service enable/disable service request with the subscriber identity information according to the service type.

3. The electronic device of claim 1, wherein the control unit is configured to control the call forwarding service enable/disable operation when a call forwarding service function for supporting a communication service with one identity number shared with the companion electronic device is activated.

4. The electronic device of claim 1, wherein the control unit is configured to determine whether a call forwarding service enable/disable condition is fulfilled based on short range communication link status with the companion electronic device, movement of the electronic device, and movement of the companion electronic device.

5. The electronic device of claim 3, wherein the control unit is configured to activate the call forwarding service function when subscriber identity information of the electronic device is identical with the subscriber identity information of the companion electronic device or when a user input for activating a call forwarding service function is detected.

6. The electronic device of claim 1, wherein the control unit is configured to check a type of the electronic device and configure, when the electronic device is a wearable device, the call forwarding operation to receive a call addressed to the companion electronic device connected through a short range communication link upon detection of short range communication link establishment and to forward the call to the companion electronic device upon detection of short range communication link release and, when the electronic device is a host device, the call forwarding operation to disable the call forwarding upon detection of the short range communication link establishment and to enable the call forwarding upon detection of the short range communication link release.

7. The electronic device of claim 6, wherein the control unit is configured to turn off a function of the communication unit when the electronic device is the wearable device and connected to the companion electronic device through the short range communication link.

8. The electronic device of claim 1, wherein the control unit is configured to configure the call forwarding function to enable/disable the call forwarding in the operation mode mapped to the service type.

9. A bidirectional communication control method of an electronic device, the method comprising:
 checking information on a communication service;
 determining a service type corresponding to the communication service information;
 preparing a call forwarding operation mode corresponding to the determined service type; and
 controlling, when a call forwarding enable/disable condition is fulfilled, a call forwarding function to enable/disable the call forwarding to a companion electronic device,
 wherein the service type corresponding to the communication service information comprises a first service type supporting supplementary service-based communication service, a second service type supporting the communication service allowed only for a configured primary device, a third service type supporting the communication service allowed for both the electronic devices, and a fourth service type supporting the communication service in which an operator network provides the call forwarding service.

10. The method of claim 9, wherein checking the information on the communication service comprises checking the communication service information based on country information and network information stored in a subscriber identity module and determining the service type comprises determining the service type mapped to the communication service information based on an operator identity code and information mapped to the service type.

11. The method of claim 9, further comprising:
checking a short range communication link status to the companion electronic device;
comparing subscriber identity information of the electronic device and the companion electronic device with each other; and
activating, when the subscriber identity information of the electronic devices matches, the call forwarding service for use of the electronic device and the companion electronic device with one identity number.

12. The method of claim 9, further comprising:
detecting, when subscriber identity information of the electronic devices connected through a short range communication link does not match, a user input for call forwarding service activation request; and
activating the call forwarding service for use of the electronic device and the companion electronic device with one identity number according to the user input.

13. The method of claim 9, wherein controlling the call forwarding function comprises determining whether a call forwarding service enable/disable condition is fulfilled based on short range communication link status with the companion electronic device, movement of the electronic device, and movement of the companion electronic device.

14. The method of claim 9, wherein controlling the call forwarding function comprises transmitting, when the electronic device is a wearable device, a call forwarding service configuration request to a server which configures the call forwarding operation to receive a call addressed to the companion electronic device connected through a short range communication link upon detection of short range communication link establishment and to forward the call to the companion electronic device upon detection of short range communication link release.

15. The method of claim 14, further comprising turning off a function of a communication unit when a short range communication link is established with the companion electronic device and the call forwarding service activation condition is fulfilled.

16. The method of claim 9, wherein controlling the call forwarding function comprises transmitting, when the electronic device is a host device, a call forwarding service configuration request to a server to disable the call forwarding upon detection of a short range communication link establishment and to enable the call forwarding upon detection of a short range communication link release.

17. The method of claim 9, wherein controlling the call forwarding function comprises performing the call forwarding service based on the information on one of a supplementary service-based communication service, a communication service allowed only for a configured primary device, a communication service allowed for both the electronic devices, and a communication service in which an operator network provides the call forwarding service.

18. A non-transitory storage media storing at least one command for executing a bidirectional communication control method of an electronic device, the at least one command comprising:
checking information on a communication service;
determining a service type corresponding to the communication service information;
preparing a call forwarding operation mode corresponding to the determined service type; and controlling, when a call forwarding enable/disable condition is fulfilled, a call forwarding function to enable/disable call forwarding to a companion electronic device,
wherein the service type corresponding to the communication service information comprises a first service type supporting supplementary service-based communication service, a second service type supporting the communication service allowed only for a configured primary device, a third service type supporting the communication service allowed for both the electronic devices, and a fourth service type supporting the communication service in which an operator network provides the call forwarding service.

* * * * *